United States Patent [19]
Slegel et al.

[11] Patent Number: 6,092,185
[45] Date of Patent: *Jul. 18, 2000

[54] OPCODE COMPARE LOGIC IN E-UNIT FOR BREAKING INFINITE LOOPS, DETECTING INVALID OPCODES AND OTHER EXCEPTION CHECKING

[75] Inventors: Timothy John Slegel, Staatsburg; Mark Anthony Check, Hopewell Junction, both of N.Y.

[73] Assignee: International Business Machines Corporation, Armonk, N.Y.

[ * ] Notice: This patent is subject to a terminal disclaimer.

[21] Appl. No.: 09/070,538

[22] Filed: Apr. 30, 1998

[51] Int. Cl.[7] .............................. G06F 9/30; G06F 9/312; G06F 9/48
[52] U.S. Cl. .................. 712/219; 712/226; 712/228; 712/205; 712/208; 712/244
[58] Field of Search .................................... 712/209, 226, 712/219, 228, 205, 208, 244

[56] References Cited

U.S. PATENT DOCUMENTS

| | | | |
|---|---|---|---|
| 4,651,321 | 3/1987 | Woffinden et al. | 371/38 |
| 5,790,843 | 8/1998 | Borkenhagen et al. | 395/567 |
| 5,870,598 | 2/1999 | White et al. | 395/581 |

OTHER PUBLICATIONS

"Opcode Compare Facility" Research Disclosure, Jul. 1990, No. 315, PO889–0224.

"Designing Flexibility into Hardwired Logic" IBM Technical Disclosure Bulletin, vol. 37, No. 3, Mar. 1994, pp. 321–324.

*Primary Examiner*—Richard L. Ellis
*Assistant Examiner*—Jungwon Chang
*Attorney, Agent, or Firm*—Lynn L. Augspurger

[57] ABSTRACT

A computer processor which has an apparatus in its Execution Unit (E-unit) that detects a match between an opcode about to be executed and opcodes programmed into it by the computer manufacturer provides a method for alleviating design deficiencies in the processor. The E-unit further contains a mechanism for transmitting the opcode and a desired action back to the Instruction Unit (I-unit) where it may be compared with the next instruction that is decoded. Furthermore, the E-unit opcode compare logic contains a mechanism for breaking infinite loops that may result. This E-unit opcode compare mechanism, may also be used for other purposes such as detecting invalid opcodes and other exception checking since it may allow for a faster cycle time of the processor than if this logic were implemented in the I-unit.

9 Claims, 2 Drawing Sheets

OPCODE COMPARE LOGIC IN E-UNIT FOR BREAKING INFINITE LOOPS, DETECTING INVALID OPCODES AND OTHER EXCEPTION CHECKING

FIELD OF THE INVENTION

This invention is related to computer systems and in particular to processors that implement opcode compare logic to work around flaws that exist in the hardware design.

CROSS REFERENCE TO RELATED APPLICATIONS

The present application related to the following co-pending patent application filed concurrently herewith:

Processor E-Unit to I-Unit Interface Instruction Modification filed Apr. 30, 1998 and accorded U.S. Ser. No. 09/070,537.

This co-pending application and the present application are owned by one and the same assignee, International Business Machines Corporation of Armonk, N.Y.

GLOSSARY

MVC: "Move Character"—an S/390 instruction
XC: "Exclusive OR Character"—an S/390 instruction
SIE: "Start Interpretive Execution"—an S/390 instruction, and also, an operating environment for the Central Processing Unit (CPU)
S/390 Designates the instructions used by the operating system of a mainframe server system handling "S/390" instructions of the kind sold by International Business Machines (Registered Trademark and Tradename) and Hitachi (Registered Trademark and Tradename).
XTCA: "Extended Test Coverage Assist"—A mode used to trace certain events. It is only enabled when a processor is running in a Hitachi mode.

BACKGROUND OF THE INVENTION

In the IBM Technical Disclosure Bulletin publication article entitled "Designing Flexibility into Hardwired Logic" (TDB v37 n3 03–94 p321–324) the authors, M A Check, A Lo, and J R Smith, disclosed the use of opcode compare logic for adding flexibility to a logic design which contains hardwired logic. The primary reason for using hardwired logic is to maximize performance, but this has the disadvantage of being rigid, and the hardware must be replaced whenever there is a design change. In some situations changes occur frequently, and it becomes very costly for the manufacturer to replace hardware with each change. This article outlines a solution to this problem and shows how to design logic that is hardwired for performance and flexible to change. The technique is to design the hardwired logic and then implement some programmable logic on the side for use whenever the design must change. Design changes are performed by switching out a portion of the hardwired logic and replacing it with programmable logic. Since most changes are small, the system remains mostly hardwired and the impact on performance is usually negligible. As an application of this design technique, the focus will be on the instruction decode logic of a central processor. It is common for architecture changes to occur after the hardware has been released to the field. By making an instruction decoder which is partially programmable, the manufacturer can save a significant amount of money on the cost of doing field upgrades for changes in the instruction set. A second advantage of using a partially programmable decoder is its power as a debugging tool. Opcode Compare is a tool for debugging problems in the central processor (CP). It was described in the article as consisting of a set of programmable opcode registers, each with a control word. The user has the ability to control the way instructions decode and execute by writing values into the opcode and control registers. To modify the behavior of an instruction, the opcode is written to one of the opcode registers and a control word is also written. Each time that opcode decodes, its hardwired instruction characteristic is modified according to the value of the control word. Actions that can be controlled include disabling multiple instructions per cycle decode, disabling decode until all prior instructions complete (disable overlap), serialization and switching execution between hardware and microcode or millicode elements.

Every computer system must deal with architectural changes. A common occurrence is the announcement of new instructions, where a previously reserved invalid opcode becomes valid. In cases where the hardware is in the field, the manufacturer usually offers to upgrade the customer's system to meet the new architecture. By using the design techniques discussed below, the manufacturer can minimize its hardware replacement cost. To do this, the manufacturer reprograms the hardware for the instruction decoder to mark the new opcode valid and dispatch it to an appropriate execution unit. Depending upon available space on chip, there are two choices for implementing this. If space is not a constraint, then every reserved invalid opcode is mapped into a unique address in an array. The array contains an instruction characteristic for each opcode. To change an opcode from invalid to valid, a new instruction characteristic is written to the array. Then, whenever this opcode is encountered, it will decode and execute as specified by the characteristic entered in the array. If space is a constraint, then a limit is placed on the total number of opcodes that can be transformed from invalid to valid. The opcodes to be transformed are entered into a set of registers similar to the ones used for Opcode Compare. Each compare register points to an address in the array. As above, to change an opcode from invalid to valid, a new instruction characteristic is written into the array and will be used whenever this opcode decodes. In both implementations the output of the hardwired decoder is blocked one cycle to give the array a chance to produce a new characteristic for this instruction. The article illustrates how to implement this type of flexibility.

However, in so far as we have been able to determine, until now Opcode Compare logic is commonly implemented in the instruction unit (I-unit) where it has the disadvantage where it can adversely affect cycle time. We have found no processor which has implemented Opcode Compare logic in the execution unit (E-unit), and we with this application report that we have found that there are advantages in doing so, as we will describe, specifically with respect to our processor E-Unit to I-Unit interface mechanism for instruction modification with these features below.

SUMMARY OF THE INVENTION

Our invention provides a system and method for alleviating computer design deficiencies implementing Opcode Compare logic in the E-Unit which improves the cycle-time of critical paths in the I-unit. It allows additional flexibility to the actions that can be performed by implementing this in the E-unit. And it solves problems associated with a different instruction being decoded after serialization and avoids processor loops.

Within this environment we have provided a mechanism for the E-unit to inform the I-unit on what instruction is being compared against and what action to take. The invention also provides a mechanism for the E-unit to avoid getting the processor into an endless loop. Other uses for this general mechanism which could be implemented includes work that is normally done in the decode cycle in the I-unit, is instead done in the E-unit to remove it from the cycle-time limiting path of the processor. We will delineate the processor E-Unit to I-Unit interface mechanism for instruction modification with these features below.

These and other improvements are set forth in the following detailed description. For a better understanding of the invention with advantages and features, refer to the description and to the drawings.

Figure 1:
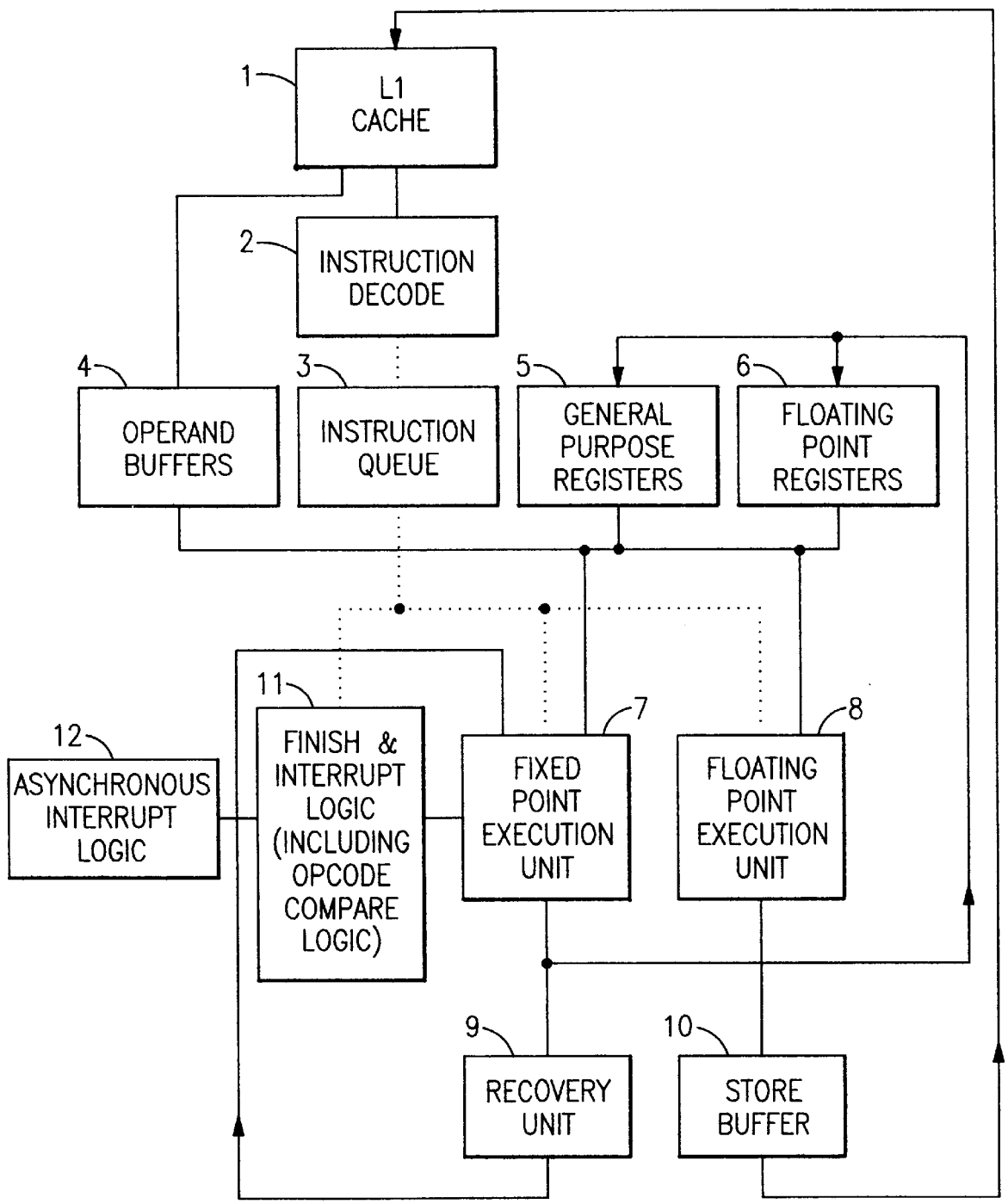
FIG. 1 shows schematically an overview of the preferred embodiment and particularly shows a block diagram illustrating the main components of a typical central processor (CP) in accordance with a preferred specific embodiment of the invention. Of particular interest is the Finish & Interrupt Logic which also contains the E-unit opcode compare logic.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to explain that a computer's CPU typically contains an Instruction-Unit (I-Unit) for fetching and decoding instructions and an Execution-Unit (E-Unit) for actually executing the instructions. Some advanced CPUs also contain special logic to allow the processor to continue functioning even if there are design problems with the logic circuits. One example of this type of logic is Opcode Compare logic. This logic, typically located in the I-Unit, would monitor instructions as they are decoded and if it matches a certain pattern set-up by the logic design engineer, some action would be taken. Possible actions might be to discard all execution of partially completed instructions and restart (serialization) or to force that instruction to microcode/millicode for execution.

One problem that we have encountered when implementing the Opcode Compare logic in the I-unit is that it often becomes part of the cycle-time limiting path for the processor. It also is somewhat limiting in the types of actions that can be taken as a result of a valid compare. So we concluded that there would be many advantages if the Opcode Compare logic can be located elsewhere. We have added Opcode Compare logic to the E-unit in addition to Opcode Compare logic in the I-unit.

However, when moving or adding the Opcode Compare logic to the E-Unit we faced a very significant problem with having Opcode Compare logic in the E-unit. After a valid comparison is obtained in the E-unit, for many actions, the processor must be serialized and instruction that have not yet been completed must be reprocessed; this would be the case if we wanted to force that instruction to be executed by microcode/millicode. When the instruction is decoded again in the I-unit, it might not be the same instruction. Some cases where might cause this are: another processor in an SMP system stored into this processor's instruction stream, an asynchronous interrupt, etc. So the I-unit can not blindly go ahead and take the action after being told to do so by the E-unit. Note the conditions that cause an instruction to be changed are very rare. However, it must be accounted for or the architecturally correct results will not be obtained.

While our preferred embodiment can be implemented in different architectures, all of which have an I-unit and E-unit, as we work with IBM's ESA/390 architecture now, another problem, specific to the ESA/390 or S/390 architecture is the efficient implementation of the XC and MVC instructions. Both instructions have two commonly used varieties (no overlap, and one-byte destructive overlap) plus the very rare generalized destructive-overlap case. A typical hardware implementation might perform the two common cases in hardware but implement the generalized destructive-overlap case in microcode/millicode and so an efficient hardware mechanism is needed to accomplish this.

Our processor E-Unit to I-Unit interface mechanism for instruction modification with these features below presents a solution to these problems.

When the E-Unit Opcode Compare logic detects a match on an instruction that has been programmed into it by a logic design engineer, for most actions it must first serialize the processor. This discards any partially completed instructions, including the one that caused the Opcode Compare and any subsequent instructions. Any earlier instructions would have already completed and there results written to registers or stored into main storage.

The E-unit Opcode Compare logic then sends the opcode that it just detected on, back to the I-unit on a special purpose bus. This may be the architected opcode or, more likely, some internal encoding of the opcode that it originally received from the I-unit. It also passes back a code to the I-unit with the action the I-unit should take. Some examples might be to force this instruction to microcode/millicode for execution, or disable instruction overlap after this instruction decodes.

The I-unit would then begin instruction fetching again. When it decodes the first instruction, it must compare the opcode it decoded with the opcode it received on the bus from the E-unit. If they are the same, then the I-unit would take the action that was indicated by the E-unit. However, if the opcodes do not match, the I-unit must execute this instruction normally with no special handling. The latter case is the one where a different instruction is fetched after the serialization event.

However, there is still a significant problem with this mechanism: an infinite loop in the processor is possible. Consider the case where the Opcode Compare logic was configured to serialize the processor before execution of the instruction that is detected. If nothing special were done, the E-unit would serialize before executing it, the I-unit would fetch/decode it and send it back to the E-unit, and the E-unit would again serialize before executing it. So the processor is stuck in an infinite loop.

To fix this problem, we added a latch to the E-unit Opcode Compare logic called BREAK_LOOP_REG. The logic to control this latch is as follows:

```
BREAK_LOOP_REG <= OPCMP_SRLZ_BEFORE or
      (BREAK_LOOP_REG and (not IU_EU_OP_NOMATCH) and
      (not (ENDOP and (not EXC_COND))));
   where
      OPCMP_SRLZ_BEFORE indicates the E-unit Opcode Compare logic has
         detected a valid comparison with an action of serialize the
         the processor before executing this instruction.
      IU_EU_OP_NOMATCH is a line from the I-unit to the E-unit indicating
         it did not detect a match on the last opcode compare.
      ENDOP indicates an instruction is completing.
      EXC_COND indicates something anomalous has occurred with the
         currently executing instruction and the processor needs to be
         serialized.
```

In words, the equation above means:

The latch will be set if a valid opcode compare occurs.

The latch will be held if the I-unit does not indicate it detected a mismatch on the last opcode compare.

The latch will be reset whenever an instruction completes normally.

When the BREAK_LOOP_REG latch is active, the E-unit Opcode Compare logic is temporarily disabled and the instruction is allowed to proceed to execution normally.

A few more words are necessary to explain the IU_EU_OP_NOMATCH term. Suppose an instruction has a valid opcode compare detected on it by the E-unit, but when the I-unit fetches/decodes it again it has been changed to a different opcode. The I-unit would detect the mismatch and send it with no special processing to the E-unit. However, since the BREAK_LOOP_REG latch is now on, it would also block the Opcode Compare and it would be processed incorrectly. So when the I-unit detects this mismatch, it activates the IU_EU_OP_NOMATCH to the E-unit which clears the BREAK_LOOP_REG latch.

Our design also uses this mechanism to force the generalized destructive-overlap case of the S/390 instruction MVC and XC to millicode/microcode. The I-unit detects the destructive-overlap after the instruction has already been dispatched to the E-unit and it is too late to force it to millicode, itself. So the I-unit sends a signal to the E-unit informing it that an instruction has destructive-overlap. The E-unit then uses the mechanism discussed above to inform the I-unit to force the instruction to millicode.

There are other potential uses to this general mechanism of deferring work normally done in the I-unit decode cycle to the E-unit where the cycle-time impact to the processor is less critical. Some of these are specific to the S/390 architecture while others are useful in many different architectures:

1. Invalid opcode exception checking (Operation Exception in S/390 terms but applicable to other architectures as well)
2. Invalid fields in instruction text checking (S/390 Specification Exception in S/390 terms but applicable to other architectures as well). Note this usage would require the E-unit to pass back to the I-unit more information than the opcode and probably the full I-text of the current instruction.
3. Invalid authority for execution checking (Privileged Operation Exception in S/390 terms but applicable to other architectures as well)
4. S/390 SIE intercept detection.
5. S/390 Special Operation exception detection.
6. Hitachi S/390 XTCA detection.

Turning now to our invention in greater detail, it will be seen from FIG. 1 which illustrates our preferred embodiment in which a typical processor is shown and the components relevant to this invention. An L1 cache (1) containing the most recently used instruction and operand data supplies instruction text to the instruction decode logic (2). This logic parses the instruction and passes the relevant components to the instruction queue (3) where it is held until it is ready to be executed. When an instruction has been decoded, the operand address(es) is calculated and the operand(s) for that instruction are fetched from the L1 cache and held in the operand buffers (4) until it is ready for execution. The general purpose registers (5) and floating-point registers (6) also supply operands to the execution unit. When all operands for a given instruction are available, the fixed-point execution unit (7) or floating-point execution unit (8) then typically executes some function on the operand(s) for that instruction. When the execution of that instruction is finished, the results of that instruction are written to the general purpose registers (5) or floating-point registers (6). If it was a store-type instruction the results are instead put into a store buffer (10) where they will eventually be written back to the L1 cache (1). In parallel with writing results to the general purpose registers (5) or floating-point registers (6), results are also written to registers in the recovery unit (9) which contains the complete micro-architected state of the processor at any given time. Note that certain control registers may have local shadow copies within the instruction unit, execution unit, or other areas of the processor but the master copy of these control registers is always the recovery unit (9). In parallel with all the above operations, the finish and interrupt logic (11) is continuously monitoring and controlling the completion of the execution of all instructions and the writing of their results. Also, the asynchronous interrupt logic (12) is continually monitoring for pending asynchronous interrupts and presenting them to the finish and interrupt logic (11). The finish and interrupt logic (11) contains the E-unit opcode compare logic and continually monitors instructions are presented by the instruction queue (3) for execution in the E-unit. An alternative implementation may have this as separate logic within the E-unit.

Figure 2:
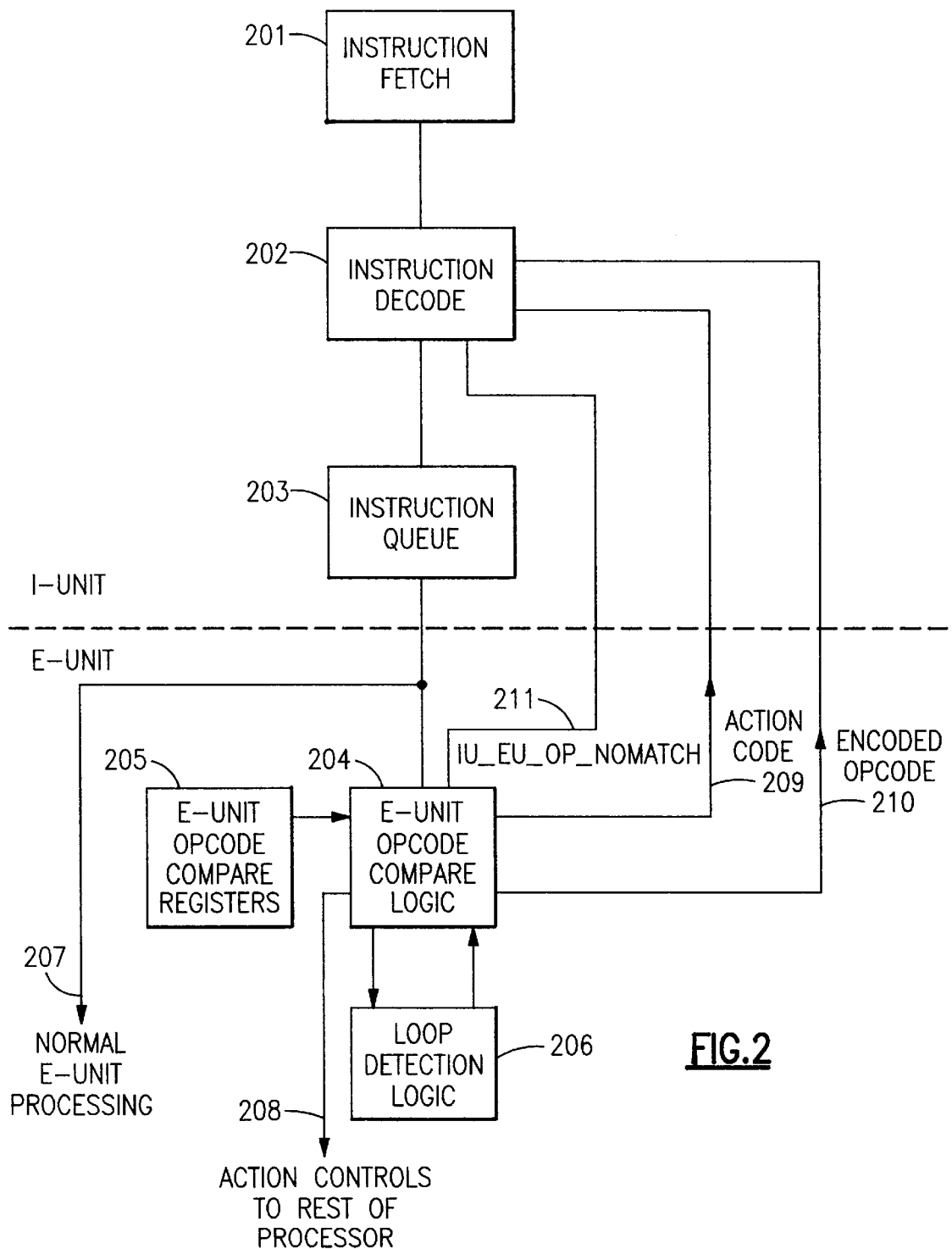
FIG. 2 shows a more detailed diagram of the E-unit opcode compare logic and its interface to the I-unit.

FIG. 2 shows the Opcode Compare logic applicable to this invention in more detail. The instruction fetch logic (201) fetches blocks of data from a cache or main storage and presents it to the instruction decode logic (202). This logic parses the instruction and passes the relevant components to the instruction queue (203) where it is held until it is ready to be executed. Note the instruction decode logic (202) may also contain Opcode Compare logic that is generally independent from that being described in this invention. When the E-unit is ready to accept a new instruction the parsed components are passed from the instruction queue (203) to the norm E-unit execution logic (207). In parallel, the E-unit Opcode Compare logic (204) compares this instruction with values stored in compare registers (205) to determine if this opcode matches what has been set up by the computer design engineer. If it does not match, no further action is taken by the E-unit Opcode Compare logic and processing of the instruction continues normally by the rest of the E-unit. If the Opcode Compare logic detects a match, further special action is taken based on action codes stored in the compare registers (205). For some types of action (e.g. delay execution of further instructions in the E-unit after completion of this one, serialize the processor after execution of this instruction, etc.), signals are sent directly to the other logic in the processor (208) to accomplish this. However, if it is an action that requires serialization of the processor before executing the instruction, the processor is serialized immediately and an action code (209) is sent back to the I-unit informing it what action to take. In addition, the opcode that compared (possibly encoded in some way) is also sent back to the instruction decode logic (210). The instruction decode logic (210) then takes an action based on the opcode compare indication from the E-unit along with the next instruction it later decodes. If when the instruction decode logic: (202) decodes the next instruction and it is not the same as the one the E-unit opcode compare detected on and informed the I-unit (210), then the I-unit informs the E-unit of this fact via the IU_EU_OP_NOMATCH signal (211). The loop detection logic (206) contains the BREAK_LOOP_REG latch that indicates that it has just serialized the processor and it should let the next instruction be processed normally without any special Opcode Compare actions. However, even if the BREAK_LOOP_REG is active but the IU_EU_OP_NOMATCH is also active, then the BREAK_LOOP_REG is reset and the Opcode Compare logic is available to handle the next instruction presented to the E-unit.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer processor method of modifying the function of a computer processor having an I-unit that fetches and decodes instructions, an E-unit that executes those instructions, and an interface between the I-unit and the E-unit enabling opcodes to be passed from the I-unit to the E-unit, comprising the steps of:

fetching and decoding instructions with said I-unit having I-unit opcode compare logic and passing opcodes from the I-unit to said E-unit having E-unit opcode compare logic for execution, and serializing in the E-unit serializes the opcodes passed to said E-unit for execution, and comparing an opcode passed to the E-unit to determine whether or not said opcode matches a predefined pattern set up for the logic, and when a match of said opcode to said predefined pattern set up for the logic is found, said E-unit transmits said opcode that matches said predefined pattern set up for the logic across said interface between the I-unit and the E-unit and back to the I-unit along with an indication of an action to take over; whereupon the I-unit upon receipt by said I-unit of said indication of an action to take over said I-unit begins fetching and decoding instructions again and I-unit compare logic compares an instruction which said I-unit decodes against said opcode transmitted to it by the E-unit, and when they match the I-unit performs the action indicated to said I-unit by the E-unit, but, if they do not match, the I-unit processes the first instruction after said fetching and decoding instructions again began normally and also transmits and indication to the E-unit that the opcodes did not match back over the interface between the I-unit and the E-unit;

wherein the E-unit opcode compare logic contains a latch that is set when a valid opcode compare occurs indicating a match with said predefined pattern set up for the logic, which latch is reset when an instruction completes execution normally, and which latch setting is held if the I-unit does not indicate it detected a mismatch on the instruction it just decoded, and temporarily disabling the function of the E-unit opcode compare logic when said latch is set, allowing the next instruction to complete execution normally.

2. A computer processor method as in claim 1 wherein said steps include enabling said E-unit opcode compare logic to force a generalized destructive overlap case of an S/390 instruction MVC ("Move Character") and XC "Exclusive OR Character" to be executed in millicode.

3. A computer processor method as in claim 1 wherein said E-unit opcode compare logic performs invalid opcode exception checking on instructions.

4. A computer processor method as in claim 1 wherein said E-unit opcode compare logic performs checks for invalid fields in said instruction.

5. A computer processor method as in claim 1 wherein said E-unit opcode compare logic performs invalid execution authority checks of the opcode.

6. A computer processor method as in claim 1 wherein said E-unit opcode compare logic performs S/390 SIE ("Start Interpretive Execution") intercept detection.

7. A computer processor method as in claim 1 wherein said E-unit opcode compare logic performs S/390 Special Operation exception detection.

8. A computer processor method as in claim 1 wherein said E-unit opcode compare logic performs Hitachi S/390 XTCA detection.

9. A computer processor method as in claim 1 wherein the E-unit opcode compare logic:

performs invalid opcode exception checking on instructions, and performs checks for invalid fields in instruction text, and performs invalid execution authority checks of the opcode, and performs S/390 SIE ("Start Interpretive Execution") intercept detection, and performs S/390 Special Operation exception detection, and performs Hitachi S/390 XTCA detection.

* * * * *